June 17, 1941.  W. S. CATHERWOOD, JR  2,246,347
METER CABINET
Filed Oct. 17, 1938
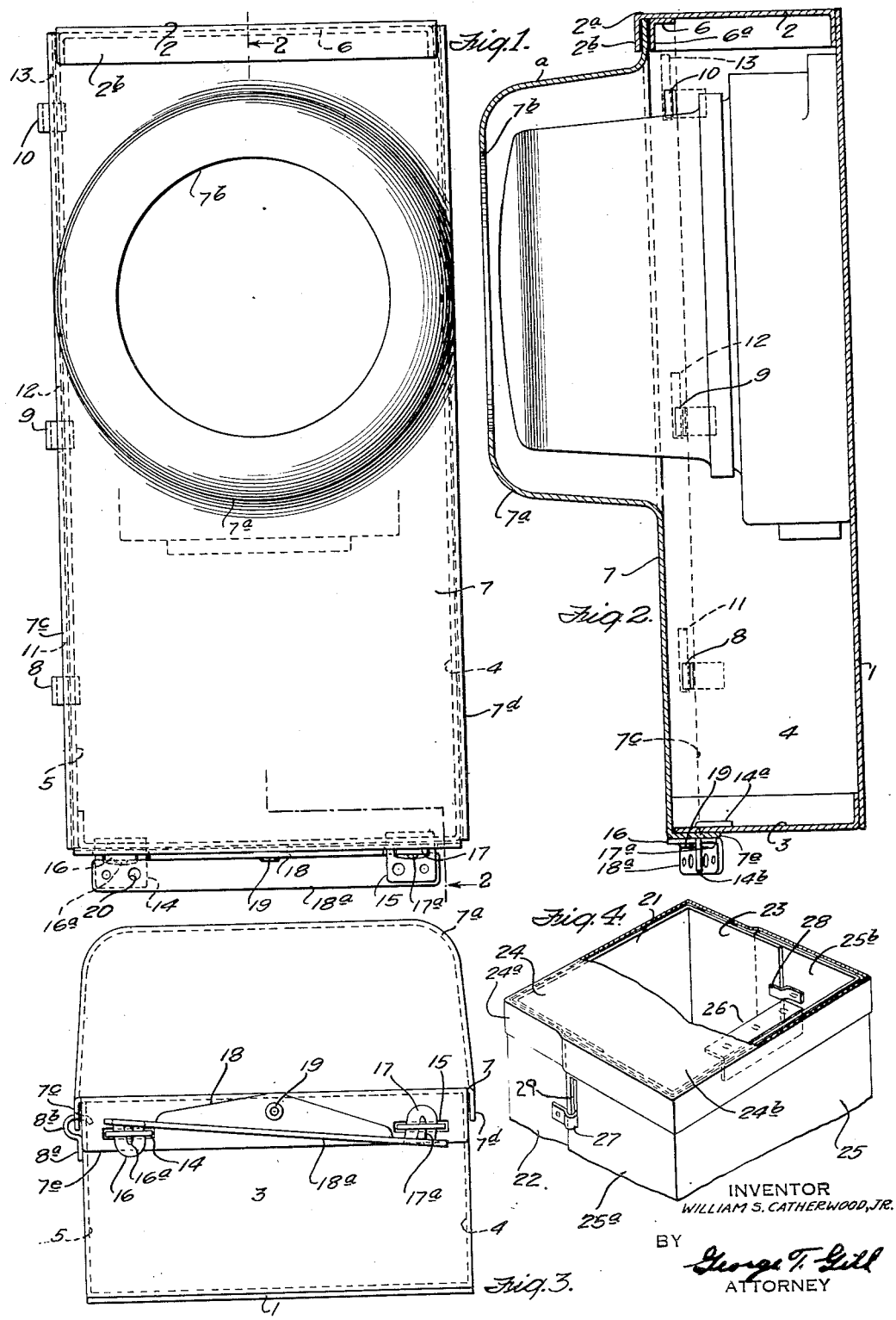

Patented June 17, 1941

2,246,347

UNITED STATES PATENT OFFICE 2,246,347

METER CABINET

William S. Catherwood, Jr., Brooklyn, N. Y., assignor to Metropolitan Device Corporation, a corporation of New York Application October 17, 1938, Serial No. 235,426

2 Claims. (Cl. 220—38)

It has become common practice to mount electric meters and the meter connections on the outside of the building being served and the invention herein disclosed relates to a meter cabinet that is particularly suitable for enclosing such meter and the meter connections.

An object of the invention is to provide a rainproof meter cabinet for enclosing the meter and meter connections mounted on the outside of a building. Another object of the invention is to provide such a cabinet in which the cover is hingedly mounted on the cabinet.

These objects and certain advantages that will hereinafter appear are realized in accordance with this invention by providing a cabinet having a sheet metal back, top, bottom and side walls. The top of the cabinet extends beyond the front of the cabinet and has a depending flange. The cover is arranged and constructed such that in the closed position, the upper edge extends adjacent the extended portion of the top and the depending flange of the top overlaps the upper edge of the cover.

Two such cabinets, embodying the invention, are illustrated in the accompanying drawing in which:

Fig. 1 is a front elevation of a cabinet for enclosing a meter and the meter connections;

Fig. 2 is a longitudinal section of the same taken along the line 2—2 of Fig. 1;

Fig. 3 is a plan of the bottom of the cabinet; and

Fig. 4 is a fragmentary, isometric of a modified form of cabinet with part of the top broken away.

The cabinet illustrated in Figs. 1 to 3 of the drawing is made of sheet metal, the several parts preferably being welded together. This cabinet includes a back 1, a top 2, a bottom 3 and side walls 4 and 5. The top 2 extends forwardly beyond the edge of the side and bottom walls forming an overhanging portion 2a having a depending flange 2b. An angle iron 6 secured to the inner surface of the top, adjacent the forward edge thereof, has a flange 6a extending parallel to the depending flange 2b.

These two flanges form a groove for the upper edge of a cover 7 for the cabinet. The cover 7 has a pressed out section 7a to accommodate the cover of a meter 8 mounted in the cabinet. An opening 7b through this portion of the cover is closed by a transparent medium so that the meter may be read without opening the cover. This cover has side flanges 7c and 7d and a bottom flange 7e that overlap, in the closed position of the cover, the side walls and the bottom respectively of the cabinet. The cover is hingedly secured to the side wall 4 of the cabinet by means of hinges 8, 9 and 10. These hinges are identical and consist, as does the hinge 8, of a strip of metal having a flat section 8a secured as by welding to the side wall of the cabinet, and a hookshaped section 8b shaped as shown and extending beyond the edge of the side wall. The hookshaped portions of the hinges 8, 9 and 10 are received in elongated slots 11, 12 and 13 respectively in the flange 7c of the cover. The length of each of the slots 11, 12 and 13 is greater than the width of the hinges by an amount to permit longitudinal movement of the cover to such an extent that the cover may be moved downwardly to clear the flange 2b depending from the top of the cabinet.

When it is desired to open the cabinet, the cover is moved downwardly of the cabinet to a position in which it clears the depending flange 2b. In this position the cover may be swung about the hinges to open the cabinet. In closing the cabinet, the cover is swung about the hinges to the closed position and then moved upwardly until the flange 7e engages the bottom of the cabinet.

For securing the cover in the upper, closed position, the position illustrated in the drawing, there is provided a pair of lugs 14 and 15, spaced apart and extending downwardly from the bottom of the cabinet. These lugs are identical. The lug 14 is made from a strip of metal bent at a right angle. One flange 14a is secured to the inner surface of the bottom of the cabinet as by spot welding. The other flange 14b extends through a slot in the bottom of the cabinet. Each of the depending lugs has a slot therethrough to receive tongues 16 and 17.

The tongues are formed as a part of a pivoted arm or lever 18 pivoted centrally thereof at 19 on the flange 7e of the cover. The lever 18 is shaped as illustrated and has a reinforcing flange 18a which also serves as a finger piece by which the lever may be moved about the pivot. Adjacent the ends of the flange 18a the tongues 16 and 17 extend from the flange, at right angles to the flange and from opposite sides of the flange. The tongue 16 has a wedge-shaped bulge 16a and the tongue 17 has a similar bulge 17a. When the cover is closed on the cabinet and in its uppermost position, the lever 18 is turned on its pivot 19 and the tongues 16 and 17 enter the slots provided therefor in the lugs 14 and 15. As the arm 18 is rotated to a position in which the flange 18a is against the lugs 14 and 15, the wedges 16a and 17a acting on the edges of the slots in the lugs force the cover to its uppermost position and wedge it in this position. To open the cabinet, the arm 18 must be first rotated to remove the tongues 16 and 17 from the slots in the lugs 14 and 15.

If desired, aligned openings, such as the openings 20 may be provided in the flange 18a and either or both of the lugs 14 and 15. Through such openings a seal may be placed for sealing the cabinet in the closed position.

In Fig. 4 of the drawing, the cabinet is illustrated as including a back 21, side walls 22 and 23, a top 24 and a cover 25. In this construction the top has a continuous, circumambient depending flange 24a. An angle member 26 is secured to the top and forms with the flange at the front of the cabinet a groove for the upper edge of the front of the cover. The side flanges 25a and 25b of the cover overlap the sides of the cabinet and are secured thereto by hinges, such as the hinge 27, similar to those previously described. In this construction a deep, straight cover is provided and stops, such as the stop 28, are provided to engage the edge of the side wall 23 to position the cover in the closed position. The hinges are received in slots 29 so that there may be limited longitudinal movement of the cover. In closing the cover, it is swung about the hinges until the stops 28 engage the edge of the side wall 23. It is then moved upwardly and locked in the position shown in Fig. 4.

It will be noted that the portion 24b of the top 24 that extends over the cover is slightly wider to embrace the upper edge of the cover. The circumambient flange 24a is appropriately shaped for the same purpose.

From the foregoing description of the embodiments of the invention illustrated in the drawing, it will be seen that by this invention there is provided a weather-tight cabinet for electrical meters and connections that is simple in construction, that is shaped and constructed to exclude rain, and that has the cover permanently secured thereon.

It will be obvious that various changes may be made by those skilled in the art in the details of the embodiments illustrated in the drawing and described above within the principle and scope of the invention as expressed in the appended claims.

I claim:

1. A meter connection cabinet of the type described comprising in combination a cabinet including sheet metal back, top, bottom and side walls, the top of the cabinet extending beyond the open end of the cabinet and having a depending flange, a cover for the cabinet including side flanges arranged to overlap the sides of the cabinet, one of said side flanges having elongated longitudinal slots therethrough, a hinge for each such slot in the flange of the cover, each hinge being secured on the side wall of the cabinet and entering a slot in the flange of the cover and being of substantially less width than the length of the slot, each such slot being so positioned with respect to its respective hinge that when the cover is in closed position the slot will extend upwardly a substantial distance above its respective hinge, whereby the cover has pivotal and longitudinal movement relative to the cabinet, and means for maintaining the cover, when closed, positioned on the cabinet with the depending flange of the top overlapping the upper edge thereof.

2. A meter connection cabinet of the type described comprising in combination a cabinet including a sheet metal back, top, bottom and side walls, the top of the cabinet extending beyond the opened end of the cabinet and having a depending flange, a cover for the cabinet including side flanges arranged to overlap the sides of the cabinet, one of said side flanges having elongated longitudinal slots therethrough, a hinge for each such slot in the flange of the cover, each hinge being secured on the side wall of the cabinet and entering a slot in the flange of the cover and being of substantially less width than the length of the slot, each such slot being so positioned with respect to its respective hinge that when the cover is in closed position the slot will extend upwardly a substantial distance above its respective hinge, whereby the cover is secured for pivotal and longitudinal movement relative to the cabinet, a flange having a pair of openings therethrough on the cover arranged to overlap the bottom of the cabinet, a pair of depending lugs having openings therethrough extending from the bottom of the cabinet and arranged to extend through the openings in the flange, and a member pivotally mounted on the flange of the cover including a pair of wedged-shaped sections arranged to extend through the opening in the lug and secure the cover in the closed position.

WILLIAM S. CATHERWOOD, Jr.